United States Patent [19]

Lew

[11] Patent Number: 5,090,251

[45] Date of Patent: Feb. 25, 1992

[54] VORTEX FLOWMETER WITH TORSIONAL VORTEX SENSOR

[76] Inventor: Hyok S. Lew, 7890 Oak St., Arvada, Colo. 80005

[21] Appl. No.: 633,290

[22] Filed: Dec. 24, 1990

Related U.S. Application Data

[63] Continuation-in-part of Ser. No. 497,904, Mar. 23, 1990.

[51] Int. Cl.$^5$ .............................................. G01F 1/32
[52] U.S. Cl. .................................................. 73/861.24
[58] Field of Search ........................ 73/861.22, 861.24

[56] References Cited

U.S. PATENT DOCUMENTS 4,727,756  3/1988  Lew ................................. 73/861.24
4,986,134  1/1991  Lew ................................. 73/861.24

Primary Examiner—Herbert Goldstein

[57] ABSTRACT

A vortex shedding flowmeter includes a vortex generating bluff body of elongated cylindrical shape disposed across a flow passage, a vortex sensing planar member with an off-set leading edge disposed downstream of the vortex generating bluff body and supported by the flowmeter body in a pivotable arrangement about a pivot axis parallel to the vortex sensing planar member and perpendicular to the central axis of the flow passage, wherein the off-set distance between the leading edges of two sections of the planar member is generally equal to one half or an integer plus one half times the wave length of the sinuating streamlines created by the vortices shed from the vortex generating bluff body, and at least one transducer converting alternating torque experienced by the vortex sensing planar member to an alternating electrical signal, wherein the fluid velocity is determined from the frequency of the alternating electrical signal and the mass flow rate of the fluid is determined from a combination of the frequency and the amplitude of the alternating electrical signal.

20 Claims, 3 Drawing Sheets

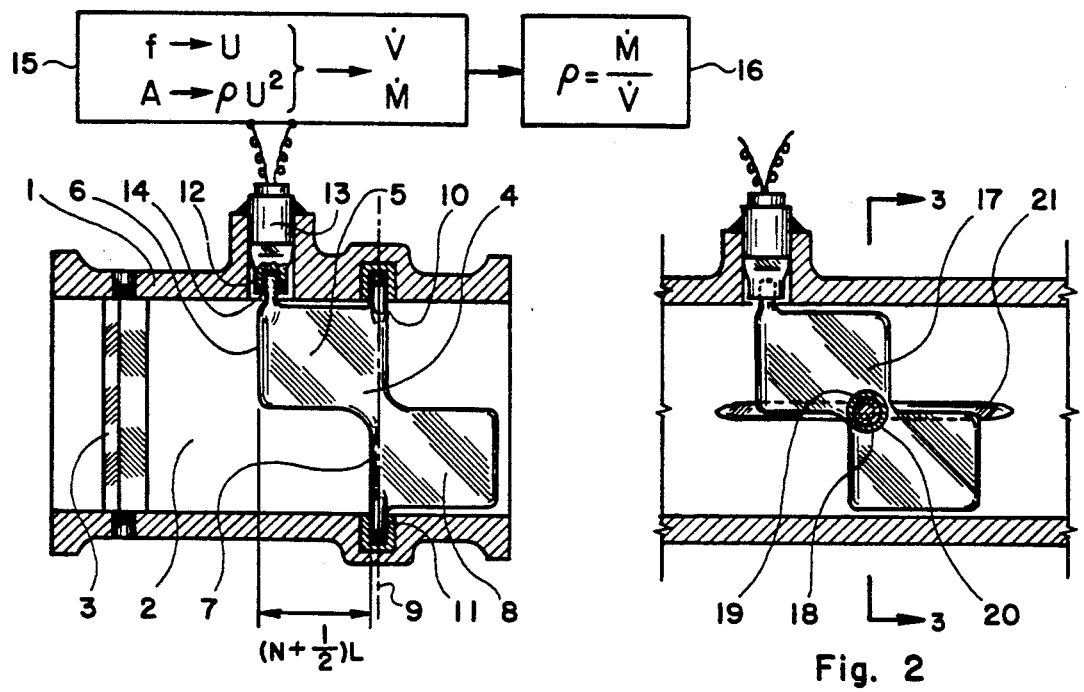
Fig. 1
Fig. 2
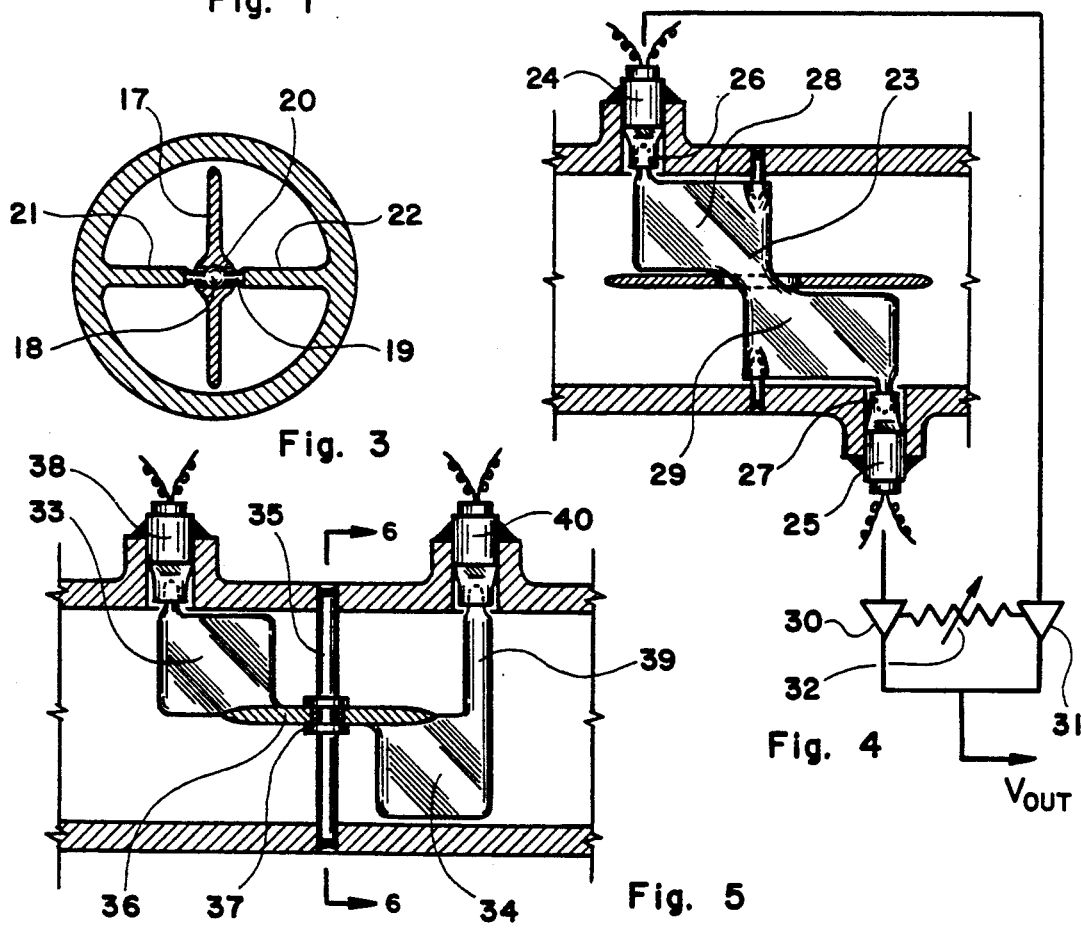
Fig. 3
Fig. 4
Fig. 5

VORTEX FLOWMETER WITH TORSIONAL VORTEX SENSOR

This patent application is a continuation-in-part to patent application Ser. No. 07/497,904 entitled "Piezo Electric Impulse Sensor" filed on Mar. 23, 1990, and, consequently, the priority on the inventions described and claimed in the present patent application is based on the inventions described in the abovementioned parent patent application.

BACKGROUND OF THE INVENTION

It is a well known fact established by experiments that a well designed vortex shedding flowmeter is capable of operating in a range with a turn-down ratio (ratio of the maximum measurable fluid velocity to the minimum measurable fluid velocity) approaching 100 to 1, and measures the flow of air under standard condition as low as a few feet per second and the flow of water as low as a fraction of a foot per second. In order to measure the fluid flow at such low velocities, the vortex shedding flowmeter must have a vortex sensor including means for rejecting the noise signals generated by the mechanical vibration of the flowmeter body in all directions and selectively detecting the signal generated by the fluid dynamic force associated with the vortices shed from the vortex generating bluff body.

BRIEF SUMMARY OF THE INVENTION

The primary object of the present invention is to provide a vortex shedding flowmeter including a vortex sensor comprising a planar member disposed downstream of the vortex generating bluff body across a cross section of the flow passage in a parallel arrangement to the bluff body on a plane generally parallel to the central axis of the flow passage, wherein the leading edges of the two halves of the vortex sensing planar member respectively located on the two opposite sides of a plane including the central axis of the flow passage are off-set from one another by a distance generally equal to a noninteger (more preferably, one half or an integer plus one half) times the wave length of the sinuating streamlines created by the vortices shed from the vortex generating bluff body, and the vortex sensing planar member is supported by the flowmeter body pivotably at least over a minute angle about a torsion axis disposed intermediate the leading edge of the first half of the vortex sensing planar member and the leading edge of the second half disposed downstream of the first half in a relationship generally parallel to the vortex generating bluff body and generally perpendicular to the central axis of the flow passage.

Another object is to provide the vortex shedding flowmeter described in the primary object of the present invention, that includes at least one transducer detecting deflective movement of one of the two halves of the vortex sensing planar member with off-set leading edge at a location off-set from the torsion axis as a measure of flow rate of the fluid moving through the flow passage, wherein the transducer converts torsional movement of the vortex sensing planar member about the torsion axis to a fluctuating electrical signal representing the fluctuating fluid dynamic force generated by the vortices shed from the vortex generating bluff body and experienced by the vortex sensing planar member.

A further object is to provide the vortex shedding flowmeter described in the primary object, that includes a pair of transducers respectively measuring deflective movements of the two halves of the vortex sensing planar member with off-set leading edges, wherein the electrical signals generated by the pair of transducers are combined in such a way that the noise signals generated by the mechanical vibration of the flowmeter body are cancelled therebetween and a refined signal representing the fluctuating fluid dynamic force genrated by the vortices and experienced by the vortex sensing planar member is obtained.

Yet another object is to provide the vortex shedding flowmeter described in the primary object, which includes a torque sensor connected to the vortex sensing planar member that converts the torque about the torsion axis generated by the vortices and experienced by the vortex sensing planar member to a fluctuating electrical signal representing the fluctuating fluid dynamic force generated by the vortices.

Yet a further object is to provide the vortex shedding flowmeter described in the primary object, wherein the vortex sensing planar member with off-set leading edge includes a planar or elongated extension extending in a direction perpendicular to the torsion axis and connected to a transducer at the extremity thereof, which transducer now converts an alternating lateral force acting in directions parallel to the central axis of the flow passage resulting from the alternating torsional movement of the vortex sensing planar member about the torsion axis to a fluctuating electrical signal that represents the fluctuating fluid dynamic force generated by the vortices.

Still another object is to provide the vortex shedding flowmeter described in the primary object, wherein the vortex sensing planar member has a mass distribution or moment of inertia distribution balanced about the torsion axis.

Still a further object is to provide the vortex shedding flowmeter described in the primary object, that determines the fluid velocity or volume flow rate of the fluid from the frequency of the fluctuating electrical signal representing the fluctuating fluid dynamic force generated by the vortices.

Yet still another object is to provide the vortex shedding flowmeter described in the primary object, that determines the mass flow rate of the fluid from a mathematical combination of the frequency and amplitude of the fluctuating electrical signal representing the fluctuating fluid dynamic force generated by the vortices.

Yet still a further object is to provide the vortex shedding flowmeter described in the primary object, that determines the density of the fluid from the ratio of the mass flow rate to the volume flow rate.

These and other objects of the present invention will become clear as the description of the present invention progresses.

BRIEF DESCRIPTION OF THE FIGURES

The present invention may be described with a greater clarity and specificity by referring to the following figures:

FIG. 1 illustrates a cross section of an embodiment of the vortex shedding flowmeter including a vortex sensing planar member with an off-set leading edge.

FIG. 2 illustrates another embodiment of the vortex sensor employing a vortex sensing planar member with an off-set leading edge.

FIG. 3 illustrates a cross section of the vortex sensor shown in FIG. 2.

FIG. 4 illustrates a further embodiment of the vortex sensor employing a vortex sensing planar member with an off-set leading edge.

FIG. 5 illustrates yet another embodiment of the vortex sensor employing a vortex sensing planar member with an off-set leading edge.

DESCRIPTION OF THE ILLUSTRATED EMBODIMENTS

Figure 6:
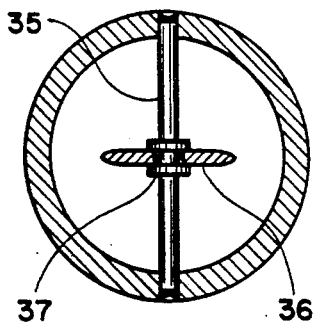
FIG. 6 illustrates a cross section of the vortex sensor shown in FIG. 5.

In FIG. 1 there is illustrated a cross section of an embodiment of the vortex shedding flowmeter, which cross section is taken along a plane including the central axis of the flow passage. The flowmeter body 1 includes a flow passage 2 extending therethrough. The vortex generating bluff body 3 of an elongated cylindrical shape is disposed across a first cross section of the flow passage 2 and secured to the flowmeter body 1 at the extremities thereof. The vortex sensing planar member 4 is disposed across a second cross section of the flow passage on a plane generally parallel to the longitudinal axis of the vortex generating bluff body 3 as well as to the central axis of the flow passage 2, which vortex sensing planar member 4 has a first half 5 with a leading edge 6 off-set from the leading edge 7 of the second half 8 by a distance equal to a noninteger times the wave length of the sinuating streamlines created by the vortices shed from the two opposite sides of the vortex generating bluff body 3 in an alternating mode. In general, it is preferred that the two leading edges 6 and 7 of the two halves of the vortex sensing planar member 4 are off-set from one another by a distance substantially equal to one half or an integer plus one half times the wave length of the sinuating streamlines as specified in the embodiment shown in FIG. 1. The vortex sensing planar member 4 is supported by the flowmeter body 1 in an arrangement that allows at least a minute amount of torsional movement about a torsion axis 9 disposed intermediate the leading edge 6 of the first half 5 and the leading edge 7 of the second half 8 of the vortex sensing planar member 4. In the particular embodiment shown in FIG. 1, a pair of journal bearings 10 and 11 respectively included at the two opposite extremities of the vortex sensing planar member 4 support the vortex sensing planar member 4 pivotably about the torsion axis 9. It should be understood that the vortex sensing planar member 4 may be connected to the flowmeter body along the torsion axis 9 in a semi-fixed arrangement as shown by the embodiment illustrated in FIG. 7, wherein the elongated members extending from the vortex sensing planar member coaxially to the torsion axis and anchored to the flowmeter body at the extremities thereof have a slender cross section that allows a torsional movement of the vortex sensing planar member over a minute angle about the torsion axis, while the same cross section provides a sufficient rigidity that prevents flexural deflection of the elongated members supporting the vortex sensing planar member. A deflective portion of the vortex sensing planar member 4 located in an off-set arrangement from the torsion axis 9, that is preferably one extremity of the leading edge of one of the two halves of the vortex sensing planar member 4, is connected to the force receiving member 12 extending from the transducer container vessel 13 by a mechanical coupling 14 such as a socket joint employed in the particular illustrative embodiment shown in FIG. 1, or by other type of coupling means such as the threaded, welded or pressure-fitted coupling.

The vortex generating bluff body 3 sheds vortices from the two opposite sides thereof in an alternating mode, which vortices create sinuating streamlines having a constant wave length proportional to the width of the bluff body 3 and independent of the fluid velocities in a wide range of the fluid velocities encompassing almost all of the flow ranges encountered in the practice of flow measurements. As the leading edges 6 and 7 of the two halves of the vortex sensing planar member 4 are off-set from one another by a distance substantially equal to one half or an integer plus one half times the wave length of the sinuating streamlines, the fluid flow involving the sinuating streamlines exerts lift forces on the two halves of the vortex sensing planar member 4 in opposite directions in an alternating mode and consequently, the vortex sensing planar member 4 experiences an alternating torque about the torsion axis 9, that produces an alternating lateral deflective movement at the leading edge portion of the first half 5 and at the trailing edge portion of the second half 8 of the vortex sensing planar member 4, which alternating deflective movement transmits an alternating lateral force to the transducer contained in the transducer container vessel 13 through the force receiving member 12. The transducer contained in the transducer container vessel 13 converts the torsional movement of the vortex sensing planar member 4 about the torsion axis 9 to a fluctuating or alternating electrical signal, that represents the fluctuating fluid dynamic force generated by the vortices. As the frequency of the alternating torque experienced by the vortex sensing planar member 4 is proportional to the fluid velocity and the amplitude thereof is proportional to the dynamic pressure of the fluid flow, that is equal to one half of the fluid density times the square of the fluid velocity, the volume flow rate of the fluid is determined from the frequency of the alternating electrical signal generated by the sinuating stream lines by using an empirically obtained functional relationship, and the mass flow rate of the fluid is determined from a combination of the frequency and amplitude of the alternating electrical signal by using another empirically obtained functional relationship. The density of the fluid can be readily determined as the ratio of the mass flow rate to the volume flow rate. In order to minimize the noise signals generated by the mechanical vibrations of the flowmeter body, the two halves 5 and 8 of the vortex sensing planar member 4 should be balanced about the torsion axis 9 in the distribution of mass or moment of the inertia about the torsion axis. A data processor 15 determines the fluid velocity U or volume flow rate $\dot{V}$ from the frequency of the vortex shedding, and determines the mass flow rate $\dot{M}$ from a combination of the frequency and amplitude of the alternating torque generated by the vortices and experienced by the vortex sensing planar member 4. Another data processor 16 determines the fluid density $\rho$ as the ratio of the mass flow rate $\dot{M}$ to the volume flow rate $\dot{V}$.

In FIG. 2 there is illustrated another embodiment of the vortex sensor employing a vortex sensing planar member 17 with an off-set leading edge having the same construction as the vortex sensing planar member 4 included in the vortex shedding flowmeter shown in FIG. 1 with one exception. The vortex sensing planar member 17 is supported by a ball and socket type joint including a ball joint 18 at the midsection of an elongated support member 19 disposed across the flow passage perpendicular to a plane including the vortex sensing planar member 17, which ball 18 engages a socket 20 included in the midsection of the vortex sensing planar member 17. The elongated support member 19 may be anchored directly to the flowmeter body or to a pair of planar flow guides such as the element 21 affixed to the wall of the flow passage. Of course, the vortex sensing planar member 17 should be balanced about the center point of the ball joint.

In FIG. 3 there is illustrated a cross section of the vortex sensor shown in FIG. 2, which cross section is taken along plane 3—3 as shown in FIG. 2. A pair of planar flow guides 21 and 22 extend respectively from two diametrically opposite portions of the wall of the flow passage, and the vortex sensing planar member 17 is disposed within a gap between the edges of the two planar flow guides 21 and 22. The elongated support member 19 including the ball joint 18 at the midsection thereof extends across the gap between the two planar flow guides 21 and 22, and anchored thereto at the two extremities. The ball joint 18 engages the socket 20 included in the midsection of the vortex sensing planar member 17 in a retaining relationship.

In FIG. 4 there is illustrated a further embodiment of the vortex sensor employing a vortex sensing planar member 23 with an off set leading edge having essentially the same construction as the vortex sensing planar member 4 included in the embodiment shown in FIG. 1 with a few exceptions. The vortex sensor includes a pair of transducers 24 and 25, wherein the two force receiving members 26 and 27 respectively extending from the two transducers 24 and 25 are connected to deflective portions of the two halves 28 and 29 of the vortex sensing planar member 23, respectively. The two electrical signals respectively generated by the two transducers 24 and 25 are amplified by two amplifiers 30 and 31, and then combined in such a way that the noise signals generated by the mechanical vibration of the flowmeter body are cancelled and a refined output signal $V_{OUT}$ representing the vortex shedding is obtained. The signal balancing means 32 balances levels of the signals between the two amplifiers 30 and 31 in such a way that noise signals are cancelled therebetween. The pair of amplifiers 30 and 31 may comprise two noninverting amplifiers or an inverting and a noninverting amplifier depending on the relative polarities of the two transducers 24 and 25.

In FIG. 5 there is illustrated yet another embodiment of the vortex sensor employing a vortex sensing planar member with an off-set leading edge, that has a construction quite similar to the vortex sensing planar member shown in FIG. 4. The two halves 33 and 34 of the vortex sensing planar member are disposed on two opposite sides of an elongated support member 35 extending across the flow passage in a direction parallel to a plane including the vortex sensing planar member and anchored to the flowmeter body at the two extremities thereof, which two halves 33 and 34 are respectively affixed to two extremities of a planar flow guide 36 disposed on a plane perpendicular to the plane including the vortex sensing planar member and pivotably supported by the elongated support member 35 by means of the journal bearing 37. The first transducer 38 directly connected to the first half 33 of the vortex sensing planar member detects the deflective movement thereof created by the alternating torsional movement about the torsion axis coinciding with the central axis of the elongated support member 35. The second half 34 of the vortex sensing planar member includes an extension 39 disposed parallel to and off-set from the torsion axis, that is connected to the second transducer 40 detecting the deflective movement of the second half 34 of the vortex sensing planar member created by the alternating torsional movement of the vortex sensing planar member about the torsion axis. The two electrical signals respectively generated by the two transducer 38 and 40 are combined in the same manner as that described in conjunction with FIG. 4.

In FIG. 6 there is illustrated a cross section of the vortex sensor shown in FIG. 5, which cross section is taken along plane 6—6 as shown in FIG. 5. The planar flow guide 36 supporting the two halves of the vortex sensing planar members and pivotably supported by the elongated member 35 may extend partially or entirely across the cross section of the flow passage.

Figure 7:
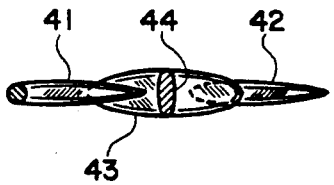
FIG. 7 illustrates yet a further embodiment of the vortex sensor employing a vortex sensing planar member with an off-set leading edge.

In FIG. 7 there is illustrated yet a further embodiment of the vortex sensor employing a vortex sensing planar member with an off-set leading edge viewed in a direction parallel to a plane including the vortex sensing planar member. The two halves 41 and 42 of the vortex sensing planar member are disposed on a common plane and connected to one another by midsection 43 disposed parallel to the central axis of the flow passage, wherein there is a spacing between two lines respectively coinciding with the trailing edge of the first half 41 and the leading edge of the second half 42 of the vortex sensing planar member. The midsection 43 includes a pair of extensions 44 and the other element hidden behind the midsection 43 respectively extending in two opposite directions towards two diametrically opposite portions of the wall of the flow passage and anchored to the wall at the extremities thereof, which extensions have a cross section of slender geometrical shape that provides torsional flexibility about the torsion axis coinciding with the central axis of the extensions, while the extensions provide a rigid support for the vortex sensing planar member against the lateral deflections transverse to the torsional axis. The journals supporting the vortex sensing planar member in a pivotable arrangement as shown in FIGS. 1, 4 and 5 may be replaced by the torsionally flexible and laterally rigid support illustrated in FIG. 7.

Figure 8:
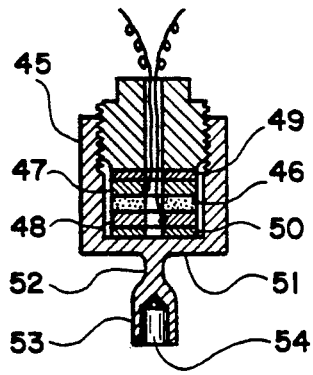
FIG. 8 illustrates a cross section of an embodiment of the transducer detecting deflective movement of the vortex sensing planar member resulting from the torsional movement thereof about the torsion axis.

In FIG. 8 there is illustrated a cross section of the embodiment of the transducer assembly, that can be employed in the construction of the vortex sensors shown in FIGS. 1, 2, 4, 5 and 7. The transducer container vessel 45 includes a cavity that contains a piezo electric disc element 46 sandwiched between a pair of electrode discs 47 and 48, and a pair of insulator discs 49 and 50, which combination is pressed against a thin wall 51 of the cavity. The thin wall 51 has a reinforcing rib 52 extending diametrically thereacross, wherefrom the force receiving member 53 with a mechanical coupling means 54 included in the extremity thereof extends. The mechanical coupling means 54 connects the force receiving member 53 to the deflective portion of the vortex sensing planar member.

Figure 9:
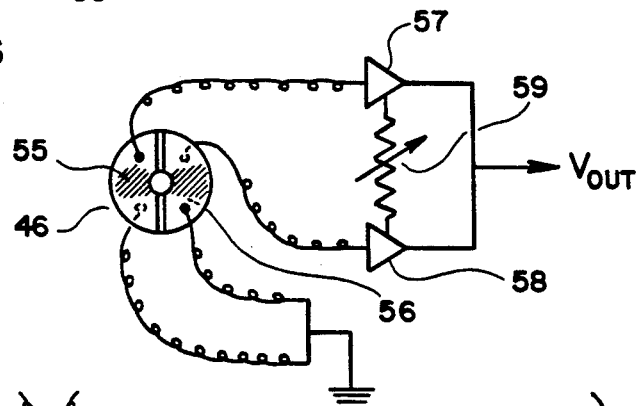
FIG. 9 illustrates a plan view of an embodiment of the piezo electric element usable in the construction of the transducer shown in FIG. 8, and an electric circuit processing the electrical signal generated thereby.

In FIG. 9 there is illustrated a plan view of an embodiment of the piezo electric disc element employed in the construction of the transducer assembly shown in FIG. 8. Each side of the piezo electric disc element 46 has two semicircular electrodes disposed on two opposite sides of a plane including the reinforcing rib 52 disposed substantially parallel to the direction of the averaged flow of the fluid. The first of the two electrodes 55 disposed on one side of the piezo electric disc element and the second of the two electrodes 56 disposed on the other side of the piezo electric disc element diametrically opposite to the electrode 55 are respectively connected to amplifiers 57 and 58 with a signal balancing means 59 therebetween, while other electrodes not connected to the amplifiers are grounded. By adjusting the signal balancing means 59, the two electrical signals from the two amplifiers 57 and 58 are combined in such a way that the output signal $V_{OUT}$ represents alternating lateral force acting in directions perpendicular to the plane including the reinforcing rib 52 and perpendicular to the central axis of the force receiving member 53, but it does not include any noise generated by other forces acting in other directions. It is readily realized that, as an alternative arrangement serving the same purpose as that of the embodiment shown in FIG. 9, the two semicircular electrodes disposed on the same side of the piezo electric element 46 may be connected respectively to an inverting and a noninverting amplifier with a signal balancing means therebetween, wherein the two signals from the two amplifiers are combined to accomplish the same object.

Figure 10:
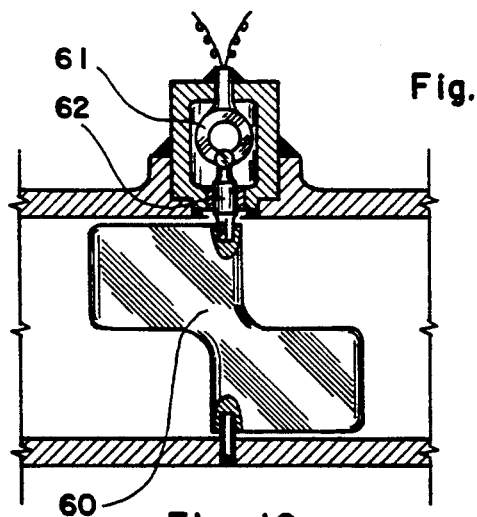
FIG. 10 illustrates still another embodiment of the vortex sensor employing a vortex sensing planar member with an off-set leading edge.

In FIG. 10 there is illustrated still another embodiment of the vortex sensor employing a vortex sensing planar member with an off-set leading edge. The vortex sensing planar member 60 is supported pivotably about its torsion axis by the flowmeter body. The torque sensor 61 is connected to the vortex sensing planar member 60 by a torsion transmitting member 62 disposed coaxially to the torsion axis. The torque sensor 61 converts the alternating torsional movement of the vortex sensing planar member 60 about the torsion axis into an alternating electrical signal. The fluid velocity or the volume flow rate is determined from the frequency of the alternating electrical signal generated by the torque sensor, while the mass flow rate is determined from a combination of the frequency and amplitude of the alternating electrical signal.

Figure 11:
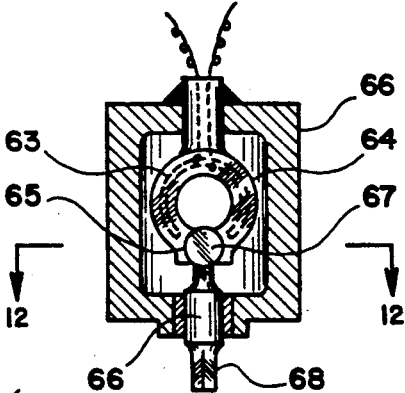
FIG. 11 illustrates an embodiment of the transducer detecting the torsional movement of the vortex sensing planar member about the torsion axis, which transducer is usable in the construction of the vortex sensor shown in FIG. 10.

In FIG. 11 there is illustrated a cross section of an embodiment of the torque sensor usable in the construction of the vortex sensor shown in FIG. 10. A piezo electric element 63 of a circular cylindrical shell shape with an axial opening is encapsulated within a metallic cylindrical shell 64 with an axial opening 65, that is rigidly anchored to a transducer container vessel 66 at a section diametrically opposite to the axial opening 65. The torsion transmitting member 67 pivotably supported by the transducer container vessel 66 has one extremity 67 with a noncircular cross sectional geometry wedged into the axial opening 65 of the metallic cylindrical shell 64, and the other extremity 68 including a mechanical coupling means for connecting to the vortex sensing planar member in a nonrotatable arrangement therebetween. The alternating torsional movement of the vortex sensing planar member about its torsion axis coinciding with the central axis of the torsion transmitting member 66 alternately expands and contracts the axial opening 65 and consequently changes the curvature of the circular cylindrical shell piezo electric element 63 in an alternating manner, which generates alternating electrical signals of opposite signs from the two cylindrical surfaces of the piezo electric element 63. The lead wires 69 and 70 respectively extending from two circular cylindrical shell electrodes respectively in contact with the two cylindrical sides of the piezo electric element 63 may be connected to an inverting and a noninverting amplifier with a signal balancing means therebetween for signal conditioning as described in conjunction with FIG. 9.

Figure 12:
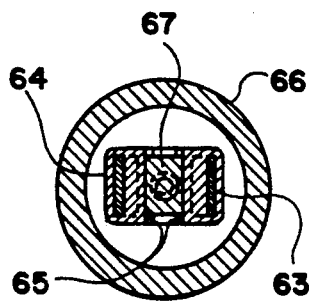
FIG. 12 illustrates a cross section of the transducer shown in FIG. 11.

In FIG. 12 there is illustrated a cross section of the torque sensor shown in FIG. 11, which cross section is taken along plane 12—12 as shown in FIG. 11. One extremity 67 of the torsion transmitting member 66 having a rectangular cross section wedged into the axial opening 65 of the cylindrical shell shaped metallic container 64 is clearly shown in this cross sectional view.

Figure 13:
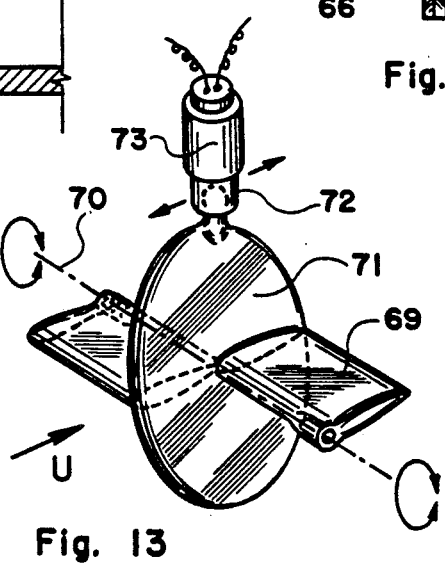
FIG. 13 illustrates a perspective view of still a further embodiment of the vortex sensor employing a vortex sensing planar member with an off-set leading edge.

In FIG. 13 there is illustrated a perspective view of still a further embodiment of the vortex sensor employing a vortex sensing planar member 69 with an off-set leading edge supported pivotably about the torsion axis 70 perpendicular to the direction of averaged fluid flow. The vortex sensing planar member 69 with an off-set leading edge has a planar extension 71 extending from the midsection of the planar vortex sensing member 69 in directions radial to the torsion axis 70. A portion of the circumferential edge of the planar extension 71 off-set from a plane including the vortex sensing planar member 69 is connected to the force receiving member 72 of a transducer assembly 73 having a construction such as that shown in FIG. 8. The particularly novel feature of the embodiment shown in FIG. 13 is the directions of the alternating lateral force transmitted to the force receiving member 72 by the alternating torsional movement of the vortex sensing planar member 69 about the torsion axis 70, which directions are parallel to the direction of fluid flow U. As the mechanical vibrations of the flowmeter body creating noise signals occur mostly in directions perpendicular to the direction of the fluid flow U, which are produced by the flexural vibrations of the pipe line including the flowmeter body, the particular embodiment of the vortex sensor shown in FIG. 13 is highly desirable in view of its ability to detect the vortex shedding while rejecting noise generated by the mechanical vibration of the flowmeter body.

Figure 14:
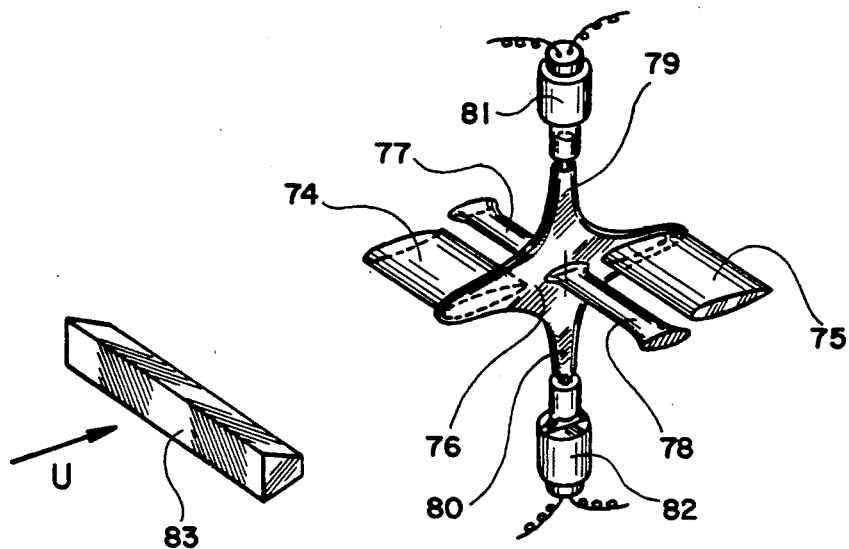
FIG. 14 illustrates a perspective view of yet still another embodiment of the vortex flowmeter including a vortex sensing planar member with an off-set leading edge.

In FIG. 14 there is illustrated a perspective view of yet still another embodiment of the vortex sensor having a construction similar to the embodiment shown in FIG. 13. The vortex sensing member includes two planar members 74 and 75 respectively extending from a midsection 76 in two opposite directions in a parallel and off-set arrangement, and is supported by elongated support members 77 and 78 disposed coaxially to the torsion axis and secured to the flowmeter body at the extremities thereof, which elongated support members support the vortex sensing member in a semi-rigid manner allowing a minute amount of pivoting movement about the torsion axis as described in conjunction with FIG. 7. The midsection 76 of the vortex sensing member has a pair of extensions 79 and 80 respectively extending therefrom in two opposite directions perpendicular to a plane including the two planar members 74 and 75, which two extensions 79 and 80 are respectively connected to two transducers 81 and 82. The signals generated by the two transducers 81 and 82 are combined as shown and described in conjunction with FIG. 4. It is noticed that the two planar members 74 and 75 are disposed on a plane generally including the central axis of the vortex generating bluff body 83.

Figure 15:
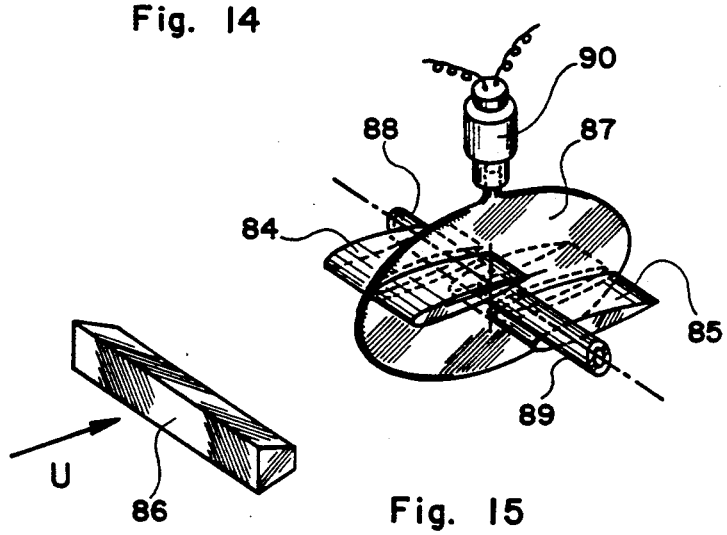
FIG. 15 illustrates a perspective view of yet still a further embodiment of the vortex flowmeter including a vortex sensing planar member with an off-set leading edge.

In FIG. 15 there is illustrated a perspective view of yet still a further embodiment of the vortex sensor including two planar members 84 and 85 disposed on two opposite sides of a plane including the longitudinal axis of the bluff body 86 and the central axis of the flow passage, wherein the leading edges of the two planar members 84 and 85 are off-set from one another in the direction of the fluid flow. The two planar members are secured to a planar support 87 at the midsections thereof, which planar support 87 disposed perpendicular to the two planar members 84 and 85 is supported by the flowmeter body in a pivotable arrangement about the torsion axis by means of the journals 88 and 89 extending from the central portion of the planar support 87 in two opposite directions in a coaxial relationship to the torsion axis. A portion of the circumferential edge of the planar support 87 is connected to the transducer 90. It is readily recognized that, as an alternative design, the torque sensor shown in FIGS. 11 and 12 can be connected to one of the two journals 88 and 89, or another transducer can be added as shown in FIG. 14.

Figure 16:
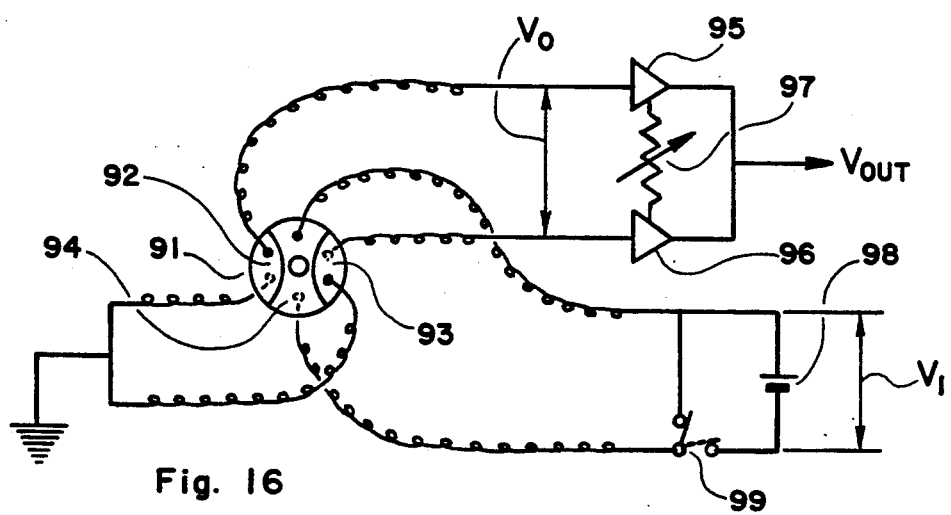
FIG. 16 illustrates another embodiment of the piezo electric element usable in the construction of the transducer shown in FIG. 8, and an electric circuit processing the electrical signal generated by the transducer.

In FIG. 16 there is illustrated another embodiment of the piezo electric disc element usable in the construction of the transducer assembly shown in FIG. 8. Each side of the piezo electric disc element 91 has two side electrodes 92 and 93 disposed on the two opposite sides of a middle electrode 94. One side electrode disposed on one side of the piezo electric disc element 93 and the other side electrode disposed on the other side of the piezo electric disc element 93 diametrically opposite to the one side electrode are respectively connected to two amplifiers 95 and 96 with a signal balancing means 97 therebetween for the same purpose as that described in conjunction with FIG. 9. Other side electrodes not connected to the two amplifiers 95 and 96 are grounded. The two middle electrodes respectively disposed on the two opposite sides of the piezo electric disc element are connected to the two opposite terminals of an electric power supply 98 through a switch 99. The electric power supply 98 intermittently imposes a test input electrical impulse of known magnitude $V_I$ across the two middle electrodes, which produces a mechanical impulse on the piezo electric element that generates a test output signal $V_O$ across the two lead wires respectively connected to the two amplifiers 95 and 96. The ratio of the amplitude of the mechanical torque generated by the vortices and experienced by the vortex sensing member to the amplitude of the electrical signal from the transducer generated by the mechanical torque can be up-dated on a real time basis by multiplying the amplitude ratio between the test input to test output values to the initial value of the ratio of the mechanical torque to the electrical signal obtained by calibrating the flowmeter at the factory. Such an updating of the functional relationship between the dynamic pressure of the fluid flow and the amplitude of the electrical signal generated thereby eliminates errors arising from a change of the operating characteristics of the piezo electric element due to the aging and temperature variation in the operating condition in determining the mass flow rate of the fluid flow from the frequency and amplitude of the alternating electrical signal generated by the vortices. It should be understood that the transducers shown in FIGS. 8, 9, 11, 12 and 16 are only a few illustrative examples of many transducers which can be employed in the construction of the vortex shedding flowmeters taught by the present invention. For example, in place of the piezo electric type transducers shown and described, other types of transducers operating on capacitive, magnetic induction, strain gauge or fiber optics principles can be employed.

While the principles of the present inventions have now been made clear by the illustrative embodiments, there will be many modifications of the structures, arrangements, proportions, elements and materials, which are obvious to those skilled in the art and particularly adapted to the specific working environments and operating conditions in the practice of the invention without departing from those principles. It is not desired to limit the inventions to the particular illustrative embodiments shown and described, and accordingly, all suitable modifications and equivalents may be regarded as falling within the scope of the inventions as defined by the claims which follow.

The embodiments of the invention, in which an exclusive property or priviledge is claimed, are defined as follows:

1. An apparatus for measuring flow of fluids comprising in combination:
   a) a body including a flow passage extending therethrough;
   b) a vortex generator of an elongated cylindrical shape disposed across a first cross section of the flow passage;
   c) a vortex sensor including a first planar member and second planar member disposed at least partially across a second cross section of the flow passage generally parallel to a plane parallel to the longitudinal axis of the vortex generator and to the central axis of the flow passage, and connected to one another structurally in an arrangement wherein leading edges of the first and second planar members are off-set from one another in direction of fluid flow by a distance equal to a noninteger times wave length of sinuating streamlines created by vortices shed from the vortex generator, wherein the combination of the first and second planar members is supported by the body in a pivotable arrangement about a torsion axis disposed intermediate leading edge of the first planar member and trailing edge of the second planar member and generally parallel to the longitudinal axis of the vortex generator and generally perpendicular to the central axis of the flow passage; and d) at least one transducer converting alternating torsional movement of the vortex sensor about the torsion axis into a fluctuating electrical signal;

wherein said fluctuating electrical signal representing vortex shedding from vortex generator provides a measure of fluid flow through the flow passage.

2. A combination as set forth in claim 1 wherein said combination includes means for determining velocity of the fluid from the frequency of said fluctuating electrical signal.

3. A combination as set forth in claim 1 wherein said combination includes means for determining mass flow rate of the fluid from a combination of frequency and amplitude of said fluctuating electrical signal.

4. A combination as set forth in claim 3 wherein said combination includes means for determining density of the fluid from ratio of the mass flow rate to volume flow rate determined from the frequency of said fluctuating electrical signal.

5. A combination as set forth in claim 1 wherein the vortex sensor has a balanced mass distribution about the torsion axis.

6. A combination as set forth in claim 1 wherein the vortex sensor has a balanced moment of inertia distribution about the torsion axis.

7. A combination as set forth in claim 1 wherein the first and second planar members are respectively disposed on two opposite sides of a plane generally parallel to the central axis of the flow passage.

8. A combination as set forth in claim 7 wherein said combination includes a planar flow guide disposed on said plane and secured to the body.

9. A combination as set forth in claim 7 wherein said combination includes a planar flow guide disposed on said plane and affixed to the vortex sensor.

10. A combination as set forth in claim 7 wherein the first and second planar members are disposed on a common plane.

11. A combination as set forth in claim 7 wherein the vortex sensor is supported by the body by at least one journal bearing allowing a pivoting movement for the vortex sensor about the torsion axis.

12. A combination as set forth in claim 7 wherein the vortex sensor is supported by the body by a ball joint disposed at a midsection of the vortex sensor intermediate the first and second planar members and supported by a cross member extending across the second cross section and secured to the body.

13. A combination as set forth in claim 7 wherein the vortex sensor is secured to the body by at least one lateral extension extending from a midsection of the vortex sensor intermediate the first and second planar member in a direction parallel to the plane parallel to the first and second planar members and affixed to the body at the extremity thereof, wherein said lateral extension has a slender cross section providing a flexibility for torsional deflection about the torsion axis and a substantial rigidity against flexural deflection in directions lateral to the torsion axis.

14. A combination as set forth in claim 1 wherein the first and second planar members are respectively disposed on two separate planes off-set from one another.

15. A combination as set forth in claim 14 wherein the first and second planar members over-lap one another in direction parallel to the torsion axis.

16. A combination as set forth in claim 1 wherein said at least one transducer comprises a motion detector connected to one of the first and second planar members for detecting deflective movement of said one of the first and second planar members at a location off-set from the torsion axis.

17. A combination as set forth in claim 16 wherein said combination includes another motion detector connected to the other of the first and second planar members for detecting deflective movement of said the other of the first and second planar members at a location off-set from the torsion axis, wherein electrical signals from said a and another motion detectors are combined in such a way that noise is cancelled therebetween and a resultant signal representing the vortices shed from the vortex generator is obtained.

18. A combination as set forth in claim 1 wherein said at least one transducer comprises a torque sensor connected to the vortex sensor in a coaxial arrangement with respect to the torsion axis for detecting torsional movement of the vortex sensor about the torsion axis.

19. A combination as set forth in claim 1 wherein said at least one transducer comprises a motion detector connected to an extremity of a lateral extension extending from the vortex sensor in a direction generally perpendicular to the torsion axis for detecting torsional movement of the vortex sensor about the torsion axis.

20. A combination as set forth in claim 19 wherein said combination includes another motion detector connected to an extremity of another extension extending from the vortex sensor in another direction generally perpendicular to the torsion axis, wherein electrical signals from said a and another motion detector are combined in such a way that noise is cancelled therebetween and a resultant signal representing the vortices shed from the vortex generator is obtained.

* * * * *